(12) United States Patent
Martin et al.

(10) Patent No.: US 11,680,166 B2
(45) Date of Patent: *Jun. 20, 2023

(54) THERMALLY STABLE AND ELECTRICALLY ISOLATING BARRIER FILM

(71) Applicant: CORNING INCORPORATED, Corning, NY (US)

(72) Inventors: Arthur Winston Martin, Madison, AL (US); Shawn Michael O'Malley, Manchester, NH (US)

(73) Assignee: CORNING INCORPORATED, Corning, NY (US)

( * ) Notice: Subject to any disclaimer, the term of this patent is extended or adjusted under 35 U.S.C. 154(b) by 14 days.

This patent is subject to a terminal disclaimer.

(21) Appl. No.: 17/412,424

(22) Filed: Aug. 26, 2021

(65) Prior Publication Data

US 2022/0033654 A1 Feb. 3, 2022

Related U.S. Application Data

(63) Continuation of application No. 16/139,628, filed on Sep. 24, 2018, now Pat. No. 11,136,458.

(60) Provisional application No. 62/569,785, filed on Oct. 9, 2017.

(51) Int. Cl.
| | |
|---|---|
| *C08L 79/08* | (2006.01) |
| *C08K 9/04* | (2006.01) |
| *C09D 179/08* | (2006.01) |
| *C09D 183/04* | (2006.01) |
| *C08G 73/10* | (2006.01) |
| *C08G 77/04* | (2006.01) |
| *C08K 5/1515* | (2006.01) |
| *C08K 5/5419* | (2006.01) |

(52) U.S. Cl.
CPC .......... *C08L 79/08* (2013.01); *C08G 73/1014* (2013.01); *C08G 73/1039* (2013.01); *C08G 77/045* (2013.01); *C08K 5/1515* (2013.01); *C08K 5/5419* (2013.01); *C08K 9/04* (2013.01); *C09D 179/08* (2013.01); *C09D 183/04* (2013.01); *C08K 2201/011* (2013.01); *C08L 2201/08* (2013.01); *C08L 2203/16* (2013.01)

(58) Field of Classification Search
None
See application file for complete search history.

(56) References Cited

U.S. PATENT DOCUMENTS

| | | | |
|---|---|---|---|
| 8,920,620 B2 | 12/2014 | Fields et al. | |
| 9,061,474 B2 | 6/2015 | Ju et al. | |
| 9,181,397 B2 | 11/2015 | Kamuro et al. | |
| 9,744,099 B2 | 8/2017 | Fadeev et al. | |
| 9,902,814 B2 | 2/2018 | Jeon et al. | |
| 11,136,458 B2 * | 10/2021 | Martin .............. | C08G 73/1014 |
| 2010/0215968 A1 | 8/2010 | Fields et al. | |
| 2010/0304106 A1 | 12/2010 | Takano et al. | |
| 2012/0037400 A1 | 2/2012 | Fields et al. | |
| 2013/0171546 A1 | 7/2013 | White et al. | |
| 2015/0070779 A1 | 3/2015 | Karam et al. | |
| 2015/0072132 A1 | 3/2015 | Fields et al. | |
| 2018/0163318 A1 | 6/2018 | Kamo et al. | |

FOREIGN PATENT DOCUMENTS

| | | |
|---|---|---|
| EP | 2660275 A1 | 11/2013 |
| EP | 2796510 A1 | 10/2014 |
| EP | 3176219 A1 | 6/2017 |

OTHER PUBLICATIONS

Ayandele et al; "Polyhedral Oligomeric Silsesquioxane (Poss)-Containing Polymer Nanocomposites"; Nanomaterials (2012), 2, pp. 445-475.
Choi et al; "Colorless Polyimide Nanocomposite Films Containing Hexafluoroisopropylidene Group"; Polym. Adv. Technol. (2011), 22 pp. 682-689.
Edwardson et al; "Site-Specific Positioning of Dendritic Alkyl Chains on DNA Cages Enables Their Geometry-Dependent Self-Assembly"; Nature Chemistry, vol. 5, (2013); pp. 868-875.
International Search Report and Written Opinion PCT/US2018/054833 dated Mar. 7, 2019.
Maegawa et al; "Synthesis and Properties of Polyimides Containing Hexaisobutyl-substituted T8 Cages in Their Main Chains"; Rsc Adv., (2016), 6 pp. 31751-31757.
Meyer et al; "Synthesis and Characterization of Polyimides Endcapped with Phenylethynylphthalic Anhydride"; Journal of Polymer Science: Part A: Polymer Chemistry; vol. 33, 2141-2149 (1995).
Ni et al; "A Review on Colorless and Optically Transparent Polyimide Films: Chemistry, Process and Engineering Applications"; Journal of Industrial and Engineering Chemistry, 28 (2015), pp. 16-27.
Pielichowski et al; "Polyhedral Oligomeric Silsesquioxanes (Poss)-Containing Nanohybrid Polymers"; Adv. Polym. Sci.; (2006); 201; pp. 225-296.

* cited by examiner

*Primary Examiner* — Sheeba Ahmed
(74) *Attorney, Agent, or Firm* — Travis B. Gasa; Michael A. Hood

(57) ABSTRACT

A thermoset barrier film including: a reaction product of the formulas (I), (II), (III), (IV), or a mixture thereof, as defined herein. Also disclosed are methods of making and using the thermoset barrier film, and devices incorporating the thermoset barrier film.

20 Claims, 10 Drawing Sheets

FIG. 1

Anhydride end-capped halogenated polyimide

Formula 1

$\{CH_2=CH-C(=O)O-\}_a-R_2\{CH=(O)=CH\}_b$

Formula 2

$\{CH=(O)=CH\}_b-R_2-Si(OR)_3$

Formula 3 fluorinated urethane-acrylate 5A fluorinated urethane-epoxy 5B

Formula 4

$\{CH_2=(O)=CH\}_b-\{SiO_x\}$ 6A $\{CH_2=CH-C(=O)O-\}_a-\{SiO_x\}$ 6B

Formula 5

Formula 6

Formula 2

Formula 4

Formula 1

Formula 3

THERMALLY STABLE AND ELECTRICALLY ISOLATING BARRIER FILM

This application is a continuation of U.S. patent application Ser. No. 16/139,628 filed on Sep. 24, 2018, which claims the benefit of priority to the U.S. Provisional Application Ser. No. 62/569,785 filed on Oct. 9, 2017, the content of each of which is relied upon and incorporated herein by reference in its entirety.

CROSS-REFERENCE TO RELATED APPLICATIONS

The present application is related commonly owned and assigned U.S. patent application Ser. No. 14/546,618, filed Nov. 18, 2014, entitled "ELECTRICALLY ISOLATING POLYMER COMPOSITION", now US20120037400, which is a continuation-in-part of parent U.S. patent application Ser. No. 12/393,296, filed on Feb. 26, 2009 (now abandoned), and divisional U.S. patent application Ser. No. 13/280,814, now U.S. Pat. No. 8,920,620, filed Oct. 25, 2011, by the same title, but does not claim priority thereto.

The entire disclosure of each publication or patent document mentioned herein is incorporated by reference.

BACKGROUND

The disclosure relates to a thermally stable, electrically isolating barrier film, and to methods of making and using the films.

SUMMARY

In embodiments, the present disclosure provides a thermally stable, electrically isolating barrier film.

In embodiments, the present disclosure provides a pre-polymerization mixture, for example comprising reactants and, separately or in admixture, an initiator, for making the disclosed thermally stable, electrically isolating barrier film.

In embodiments, the disclosure provides a method of making the thermally stable, electrically isolating barrier film by, for example, combining and polymerizing a halogenated anhydride end-capped polyimide and a fluorinated methacrylate monomer having, for example, greater than or equal to 25% such as from 30 to 70% of the available C—H sites, substituted with fluorine atoms (i.e., C—F)) (e.g., HT-EIBF-1 like films). These HT-EIBF-1 films have a lower contact angle compared to the more hydrophobic HT-EIBF-2 films mentioned herein.

In embodiments, the disclosure provides a method of making the thermally stable, electrically isolating barrier film by, for example, combining and polymerizing a halogenated anhydride end-capped polyimide and a highly fluorinated methacrylate monomer having, for example, greater than or equal to 25% such as from 30 to 100% of the available C—H sites are substituted with fluorine atoms (i.e., C—F)), and a POSS monomer including epoxy groups (e.g., HT-EIBF-2 like films). These HT-EIBF-2 films have a higher fluorine atom content and a higher contact angle compared to the less hydrophobic HT-EIBF-1 films mentioned herein.

In embodiments, the disclosure provides pre-polymer formulations, polymers thereof, and a method of making the abovementioned thermally stable, electrically isolating barrier films having even greater mechanical hardness or wear durability by, for example, incorporating a covalently bonded nanosilica particle into any of the disclosed polymer structures.

BRIEF DESCRIPTION OF THE DRAWINGS

In embodiments of the disclosure:

FIG. 1 shows schematics of exemplary barrier films of formulas (I), (II), (III), and (IV).

DETAILED DESCRIPTION

Figure 2:
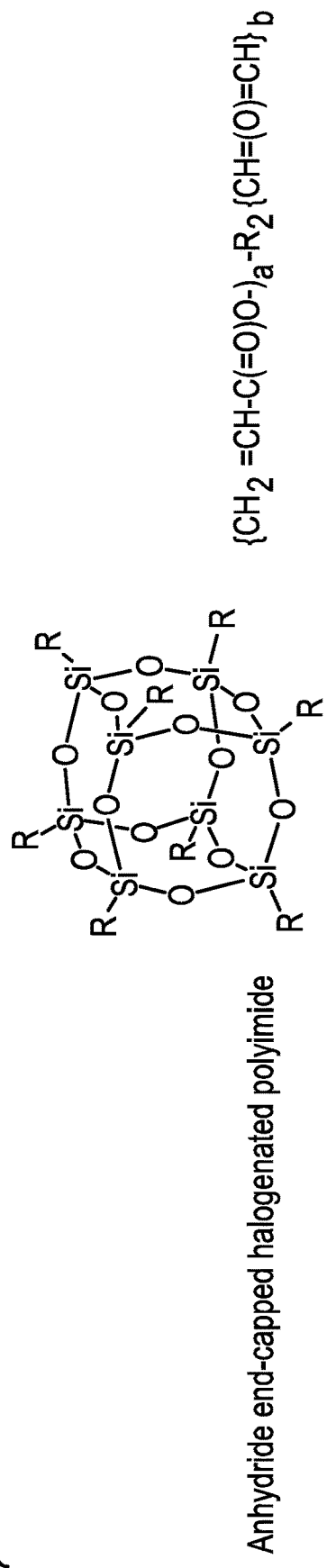
FIG. 2 shows exemplary source reactants or pre-polymerized structural components of a thermally stable film of the formula (IV) of FIG. 1.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Definitions

"HT-EIBF-1" or like terms (e.g., "HT-EIBFs" or "TS-EIBFs") refer to a high temperature or thermally stable, electrically isolating, barrier films of type-1 that were prepared without any formula 5 component, or free of the formula 5 component.

"HT-EIBF-2" or like terms (e.g., "HT-EIBFs" or "TS-EIBFs") refer to a high temperature or thermally stable, electrically isolating, barrier films of type-2 that were prepared with a formula 5 component.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

Electrically isolating barrier films are significant for the electronic industry and for specialty materials in, for example, electrowetting displays (see, e.g., liquavista.com), liquid lenses (see, e.g., varioptic.com and optilux.com), and for the digital microfluidics (see, e.g., raindancetech.com and liquid-logic.com).

Since the 1950's polyimides have been used in high temperature resistant, polymer coatings. However, polymer coating films having high voltage breakdown and high contact angles for, for example, electrical isolation applications have not been reported.

In the abovementioned commonly owned and assigned application U.S. Ser. No. 14/546,618, now US20120037400, there are disclosed high voltage resistant thermoset polymer films having dense crosslinking and high fluorine content. Thermosets unlike thermoplastics are different in that they form a uniform continuous polymer matrix over an electrode and make passage of electrons to the electrode especially difficult. Thermosets do not have a discrete molecular weight range because they are continuous. In contrast, thermoplastics have an associated molecular weight which defines their functional properties. The addition of fluorine atoms to the continuous thermoset polymer matrix is also significant because atomic fluorine is the most electronegative atom in the periodic chart and it is inert to electronic influence. For example, Teflon AF 1600 is a thermoplastic and has a voltage breakdown of about 60 Volts per micron. Parylene™ C, a chemical vapor deposited poly(p-xylylene) polymer much like a thermoplastic, has a voltage breakdown of 48 Volts per micron.

Selected films disclosed in the above mentioned copending application U.S. Ser. No. 14/546,618 had voltage breakdowns of about 1,800 volts per micron. Upon observing the dramatic difference one could conclude that the densely cross-linked heavily fluorinated thermosets are true electrically isolating barrier films while Parylene C and Teflon AF are not because they both have considerably lower voltage breakdown values of, for example, 220 and 80 volts per micron, respectively. A potential film specification is high hydrophobic water contact angles of about 115 degrees, a film thickness less than 1 micron, and to be colorless or maintain an optical clarity over a transparent conducting oxide electrode. Such films were prepared but when deployed onto 6 inch square ITO on Eagle XG glass parts striations were noticed at the edges due to air flow effects in the formulations. Accordingly, attention was turned to making a high temperature resistant version of the original densely cross-linked highly fluorinated thermosets films using polyimide oligomers, which polyimide oligomers could be cured in situ over electrodes like ITO.

Another potential film specification is a film having a high temperature polymer film including: a high voltage breakdown; a contact angle of about 80 degrees; a temperature resistance to greater than 240° C.; capable of being colored; a pencil hardness greater than 5 H or 6 H; a thickness of from 100 nm to 10,000 nm; a dielectric constant; and gloss.

In embodiment, the disclosure provides a thermoset barrier film comprising:
a reaction product comprising:
a halogenated (e.g., fluorinated) polyimide oligomer of formula 1 having anhydride end caps, in from 50 to 90 wt %;
a cross-linker of formula 2 in from 1 to 40 wt % such as 8 to 40%, comprising a polyhedral oligomeric silsesquioxane (e.g., POSS) having at least one pendant group selected from an epoxy group, a di-aryl group such as a pendant di-phenyl group, or mixtures thereof;
a tie agent having acrylate and epoxy groups of formula 3 in from 0.1 to 20 wt %, for example, Synasia S100, which tie agent couples the Cytonix monomer of formula 5 to the anhydride end-capped polyimide of formula 1;
an epoxy silane adhesion promoter of formula 4 in from 0.1 to 3 wt %, for example 2-(3,4-epoxycyclohexyl)ethyl-triethoxysilane ("EPCT"), which promoter couples the polymer to a glass substrate; and
an initiator such as of formula A, formula B, or a mixture thereof, in from 1 to 20 wt %, for example, a cationic photo-initiator such as UVI-6976 (e.g., for coupling anhydride and epoxies), a acrylate photo-initiator such as Irgacure 819, or a mixture thereof, based on a total of 100 wt % of the barrier film.

In embodiments, one can separately precoat and precondition the substrate with a difunctional epoxy siloxane tie agent or coupling agent of formula 4 (i.e., EPCT compound) or like compound. Other coupling agents suitable for combination with polyimide polymers are disclosed in commonly owned and assigned U.S. Pat. No. 9,744,099, entitled "Glass articles with low-friction coatings".

In embodiments, the barrier film can be, for example, electrically isolating and can have a voltage breakdown of from 300 to 1900 volts per micron, and from 600 to 1900 volts per micron, for example, of from greater than or equal to 600 volts per micron, for example, of from 300 to 1800 volts per micron (V/micron), and from 300 to 1000 volts per micron.

In embodiments, the film is thermally stable up to at least 250° C., i.e., the film shows no mass loss below 250° C.

In embodiments, the film can have a pencil hardness, for example, of from 4 H to 8 H, i.e., a film comprised of at least one or more of formulas 1, 2, 3, and 4, residual initiator, and an optional colorant.

In embodiments, the barrier film can further comprise at least one fluorine booster compound of formula 5 selected from the group of, for example, a fluorinated urethane-acrylate of formula 5A, a fluorinated epoxy of formula 5B, or a mixture thereof, in a total amount of from 0.1 to 30 wt % by superaddition, for example, Cytonix 6298 is a fluorine booster or fluorine boosting compound, which can increase the fluorine content of the barrier film by, for example, of from 1 to 50 wt %, of from 2 to 25 wt %, including intermediate values and ranges, and raise the voltage breakdown voltage breakdown by, for example, of from 100 to 200 volts/micron. The fluorinated urethane-acrylate can significantly enhance water repellancy by raising the water contact angle by, for example, 29°.

In embodiments, the barrier film can further comprise, for example, a surface modified nano-silica compound of formula 6 selected from at least one of formula 6A (e.g., epoxy modified), of formula 6B (e.g., acrylate modified), or a mixture of formulas 6A and 6B, in a total amount of from 0.1 to 30 wt % by superaddition. The surface modified nanosilica compounds of the formulas 6A and 6B are available, for example, from Nissan Chemicals as ORGANOSILICASOL™ as a dispersion, i.e., colloidal silica mono-dispersed in organic solvent (see nissanchem-usa.com/products/organosilicasol/). The surface modified nanosilica compounds can provide barrier film enhancements, for example, densification, gloss, hardness, thermal stability enhancement, and like properties.

In embodiments, the nanosilica fortified film can have a pencil hardness of 5 H to 8 H, i.e., a film comprised of at least one or more of formulas 1, 2, 3, 4, 5, and 6, residual initiator, and an optional colorant.

In embodiments, the barrier film can further comprise, for example, a colorant selected from an epoxy, an acrylate, or a mixture thereof, in an amount of from 0.1 to 5 wt % by superaddition. The function of the colorant is primarily for aesthetics or product differentiation or product-film integration. Colors for opaque, translucent or transparent colored films include, for example, white, yellow, black, red, orange, green, blue, and like colors. Epoxy colorants are available from, for example, Specialty Polymers & Services, Inc., such as Epoxicolor® 051 Dark Blue, Epoxicolor® 091 Black, Epoxicolor® 032 Safety Yellow, Epoxicolor® 001 white, and Epoxicolor® 031 medium yellow.

In embodiment, the disclosure provides a barrier film of the formula (I) (e.g., HT-EIBF-1 films without nanosilica hardener; i.e., no formula 6):
where
1. represents formula 1;
2. represents formula 2, which is chemically bonded to formula 1 in at least one point;
3. represents formula 3, which is chemically bonded to formula 1 in at least one point;
4. represents formula 4, which is chemically bonded to formula 1 in at least one point, and is chemically bonded to a substrate S in at least one point, which substrate is not a part of the formula of the barrier film but is rather an inanimate beneficiary of the barrier film and its properties; and
m, n, o, q, and r is each an integer from 1 to 100.

In embodiment, the disclosure provides a barrier film of the formula (II) (e.g., HT-EIBF-1 films with nanosilica hardener; i.e., with formula 6):
where
1. represents formula 1;
2. represents formula 2, which is chemically bonded to formula 1 in at least one point;
3. represents formula 3, which is chemically bonded to formula 1 in at least one point;
4. represents formula 4, which is chemically bonded to formula 1 in at least one point, and is chemically bonded to a substrate S in at least one point, which substrate is not a part of the formula of the barrier film but is rather an inanimate beneficiary of the barrier film and its properties;
6. (circle) represents a nanosilica particle structure of the formula 6, which is chemically bonded to formula 3 in at least one point; and
m, n, o, q, and r is each an integer from 1 to 100.

In embodiment, the disclosure provides a barrier film of the formula (III) (e.g., HT-EIBF-2 films without nanosilica hardener; i.e., without formula 6):
where
1. represents formula 1;
2. represents formula 2, which is chemically bonded to formula 1 in at least one point;
3. represents formula 3, which is chemically bonded to formula 1 in at least one point;
4. represents formula 4, which is chemically bonded to formula 1 in at least one point, and is chemically bonded to a substrate S in at least one point, which substrate is not a part of the formula of the barrier film but is rather an inanimate beneficiary of the barrier film and its properties;
5. represents formula 5, which is chemically bonded to formula 3 in at least one point; and
m, n, o, p, q, and r is each an integer from 1 to 100.

In embodiment, the disclosure provides a barrier film of the formula (IV) (e.g., HT-EIBF-2 films with nanosilica hardener; i.e., with formula 6):
where
1. represents formula 1;
2. represents formula 2, which is chemically bonded to formula 1 in at least one point;
3. represents formula 3, which is chemically bonded to formula 1 in at least one point;
4. represents formula 4, which is chemically bonded to formula 1 in at least one point, and is chemically bonded to a substrate S in at least one point, which substrate is not a part of the formula of the barrier film but is rather an inanimate beneficiary of the barrier film and its properties;
5. represents formula 5, which is chemically bonded to formula 3 in at least one point;
6. (circle) represents a nanosilica particle structure of the formula 6, which is chemically bonded to formula 5 in at least one point; and
m, n, o, p, q, and r is each an integer from 1 to 100.

In embodiments, the disclosure provides a two part formulation for making a thermoset barrier film, comprising:
  a first part comprising:
    a halogenated (e.g., fluorinated) polyimide oligomer of the formula 1 having anhydride end caps, in from 50 to 90 wt %;
    a cross-linker of the formula 2, for example, in from 0.1 to 40 wt %, from 8 to 40 wt %, including intermediate values and ranges, comprising a polyhedral oligomeric silsesquioxane (e.g., POSS) having at least one pendant group selected from epoxy groups, di-aryl such as pendant di-phenyl groups, or mixtures thereof;
    a coupling agent or a tie agent having at least one acrylate and at least one epoxy group of the formula 3 in from 0.1 to 20 wt %, for example, Synasia S100;
    an epoxy silane adhesion promoter of the formula 4 in from 0.1 to 3 wt %, for example (EPCT); and
  a second part comprising:
    a polymerization initiator in from 1 to 20 wt %, for example, an initiator of the formula A, formula B, or a mixture of formulas A and B, for example cationic photo-initiator such as UVI-6976, a photo initiator such as Irgacure 819, a thermal initiator, or a mixture thereof, based on a total of 100 wt %.

In embodiments, the two part formulation can further comprise at least one fluorine booster compound, for example, of formula 5 selected from, for example, a fluorinated urethane-acrylate of formula 5A, a fluorinated epoxy of formula 5B, and like compounds, or a mixture thereof, in a total amount of from 0.1 to 30 wt % by superaddition.

In embodiments, the two part formulation can further comprise at least one surface modified nano-silica compound of formula 6 selected from at least one of formula 6A (i.e., epoxy modified), of formula 6B (i.e., acrylate modified), or a mixture of formulas 6A and 6B, in a total amount of from 0.1 to 30 wt % by superaddition.

In embodiments, the two part formulation can further comprise at least one liquid vehicle in the first part, the second part, or both parts.

In embodiments, the disclosure provides a liquid or pourable formulation having the disclosed precursor barrier film polymer dissolved in a suitable solvent or suspended in a suitable liquid vehicle (i.e., "in-the-can" formulation). In embodiments, the dissolved or suspended formulation can be applied by any suitable method to a suitable surface such as a surface that has been treated with, for example, an epoxy silane adhesion promoter compound of formula 4, or adhesion promoter like compounds or mixtures thereof to produce barrier films as schematically shown by formulas (I), (II), (III), (IV), and like structures, or mixtures thereof. In embodiments, certain suitable surfaces not need to be treated with, for example, an epoxy silane adhesion promoter compound such as of formula 4, if the certain suitable surfaces have surface functionality that is compatible with and reactive with compounds of the formula 1.

In embodiments, the disclosure provides a method of making the disclosed thermoset barrier film comprising, for example:
combining:
a halogenated (such as fluorinated) polyimide oligomer of formula 1 having anhydride end caps;
a cross-linker of formula 2;
an acrylate and epoxy tie agent of formula 3;
an epoxy silane adhesion promoter of formula 4;
at least one fluorine booster compound of formula 5; and
an initiator such as of the formula A, formula B, or a mixture thereof, in a suitable solvent for a sufficient time;
initiating a reaction of the resulting mixture for a sufficient time with a suitable initiator source, for example, using radiation or heat, or a combination thereof; and
coating the resulting mixture on a substrate to form a coated substrate.

In embodiments, the method can further comprise combining a surface modified nano-silica compound of formula 6 with the mixture in the combining step.

In embodiments, the coating can be accomplished, for example, by spin coating, and like coating methods.

In embodiments, the method can further comprise drying the coated substrate to remove residual solvent.

The present disclosure is advantaged is several aspects, including for example:
providing films having excellent elevated temperature resistance, which is a significant advantage when deployed in electronic products that require durability to environmental stresses such as high temperature;

the high temperature resistance permits the films to be used with photo-resist patterning systems where, for example, a baking step is desired; and epoxy curing systems and mixed acrylate and epoxy curing systems provide films having an enhanced range of product performance over standard Parylene C coatings, for example, for use in a liquid lens device. If these fluorine containing polyimide films are used in an electrowetting device they can extend the thermal ranges of liquid transport or product functionality.

The disclosed films can be used, for example, in touch capacitive sensors, in pharmaceutical packaging as topical coatings that survive pyrolysis but protect glass vials from shattering; to grow spheroidal cell culture; to enable high temperature microfluidics; and to provide a longer shelf life for an electrowetting reflective display.

The disclosed materials can be used, for example for: optical coupling; bonding of optical glass to another glass; fiber optic coupling; aerospace applications that require resistance to thermal changes, and like applications. Other film application areas include, for example, glass coatings for laminates and architecture glass; and engineered polymer uses in electronic devices such as a circuit board substrate, in optoelectronics, to maintain electrical isolation, to protect from water damage, and provide resistance to high heat effects.

In embodiments, the present disclosure provides a thermally stable, electrically isolating barrier film.

In embodiments, the disclosure provides a method of making the thermally stable, electrically isolating barrier film by, for example, polymerizing an anhydride containing (i.e., terminated or end-capped) polyimide, a highly fluorinated methacrylate monomers, and an epoxy containing POSS monomer. Other suitable polyimide polymer source components (i.e., monomers) are disclosed in commonly owned and assigned U.S. Pat. No. 9,744,099, entitled "Glass articles with low-friction coatings," and references therein.

In embodiments, a HT-EIBF-2 film was prepared with a 20 wt % of Cytonix 6298 to increase hardness.

In embodiments, the disclosed films can have a measured thermal stability of up to, for example, 248° C. without losing mass. A dual curing system can also be used, for example, where a cationic photo-initiator UVI-6976 is combined with Irgacure 819 or Darocur 1173. Voltage breakdowns as high as 1082 volts per micron have been measured for the base matrix polyimide.

In embodiments, the disclosed films can have contact angles adjustable to water contact angles of from 89 to 112 degrees. If desired, the films can be colored with, for example, epoxy based colorants. Additionally, the films can further include reactive nanoparticles such as silica nanoparticles having acrylates or epoxy groups, which nanoparticles can increase the hardness of the films.

In embodiments, the present disclosure provides a composition for making thermally stable, electrically isolating polymer films, which films are resistant to higher temperatures of up to about 250° C. These films are significant in a variety of industries because when electronic devices are continuously operated for prolonged periods they can accumulate heat and the heat can cause a polymer film breakdown and reduce product life. The disclosed heat resistant films are also significant because they permit a much wider temperature operating range during manufacturing of devices. Certain electronic devices are manufactured in multiple steps involving heat treatment, and the enhanced thermal stability of the disclosed polymer films can be beneficial to completing the device in stages.

In embodiments, the present disclosure provides a film having polyimides, which film produces a thermally stable or temperature resistant, electrically isolating barrier film.

In embodiments, the present disclosure provides a film having a fluorine containing, anhydride end-capped polyimide, which film produces an electrically isolating hydrophobic barrier. These films are referred to as high temperature or thermally stable, electrically isolating, barrier films ("HT-EIBFs" or "TS-EIBFs").

In embodiments, the presently disclosed film compositions were able to achieve many of the above film specifications, and with some modification were able to even exceed the hardness requirement, e.g., having a hardness of about 7 and 8 H. The hardness was achieved by introducing a 5 wt % of curable silica nanoparticles, for example, having a primary particle size of about 10 to 20 nm (see e.g., Nissan Chemical MEK AC 2102 or MEK EC-2104 nissanchem-usa.com/products/organosilicasol/) into the precursor liquid. Color specification could be readily achieved by adding epoxy based colorants into what was originally a clear polyimide thermoset polymer film.

Another feature that is believed to be unique to the making of the disclosed barrier films is the use of epoxy and acrylate epoxy polymerization chemistry. In the abovementioned related application Ser. No. 14/546,618, electrically isolating barrier films based on acrylate chemistry were disclosed. The present disclosure can include epoxy systems. In embodiments, epoxy films can provide, for example, improved hardness and in some instances robust curing.

The disclosed anhydride end-capped polyimide polymers were prepared (by Designer molecules Inc. (dmi.temp-website.com/)) with an equivalent of a diamine component and a dianhydride component to produce an anhydride polyimide mentioned in the working examples (see also, for example, Meyer, G. W., et al., Synthesis and Characterization of Polyimides Endcapped with Phenylethylphthalic Anhydride, *J. Poly. Sci. Part A. Polymer Chemistry*, 1995. 33, 2141-2149; Choi, I L H, et al., Colorless polyimide nanocomposites films containing hexafluoroisopropylidene group, *Polym. Adv. Techol.*, 2011. 22, 682-689; Maegawa, T., et al., Synthesis and properties of polyimides containing hexaisobutyl-substituted T8 cages in their main chains, *RSC Adv.* 2016, 6, 31751-31757; Pielichowski, K., et al., Polyhedral Oligomeric Silsequioxanes (POSS) containing nanohybride Polymers. Manuscript on Research Gate; and Ayandele, E., et al., Polyhedral Oligomeric Silsesquioxane (POSS)-Containing Polymer Nanocomposites, *Nanomaterials* 2012, 2, 445-475; doi:10.3390/nano2040445).

In embodiments, the disclosed electrically isolating barrier films were prepared to contain selected components, which polymerized or cross-linked components achieve the goals of a film having high temperature stability and high voltage breakdown.

In embodiments, the disclosed electrically isolating barrier film composition can have the following combined main components and having exemplary formulas listed in Table 4.

1. An anhydride end-capped polyimide having a fluorine content of, e.g., formula 1. This component allows the film to be colorless, have high thermal resistance, and have high voltage breakdown resistance.

2. A POSS cross-linker of, e.g., formula 2. The cross-linker can have, for example, a mixture of di-phenyl groups and epoxy groups, and permits crosslinking of the anhydride end-capped polyimide and provides exceptionally high thermal resistance while providing a densely cross-linked polymer thermoset that is called-for to achieve high voltage breakdown thermosets.

3. S100 (Synasia) dual functional group cross-linker of, e.g., formula 3, wherein acrylate components like Cytonix 6298 of formula 5 or fluorine containing acrylates and methacrylates, can be co-polymerized into the thermally stable polyimide. Note that one can substitute, for example, S100 of formula 3 with Syna Epoxy 21 (UVR6110, ERL4221) in the event that one wishes to avoid adding an acrylate component.

4. A thermally stable silane adhesion promoter of, e.g., formula 4 (e.g., EPCT), which allows the polyimide thermoset to be attached to or tied down on or to a glass surface, or like surface.

5. UVI-6076 is a photoinitiator, which is used to ensure that the anhydride and epoxy groups cure under photocuring conditions. Alternatively, thermal curing agents for epoxy groups can be used.

6. Addition of a film hardening agent of, e.g., formula 6 such as nanosilica, for example, from NISSAN CHEMICAL, having 10 to 20 nm colloidal silica particles and having either epoxy groups or acrylate groups. An example is PGM-AC-2140Y or MEK-EC-2102 (see, e.g., nissanchem-usa.com/products/organosilicasol/).

7. An ability to optionally add in epoxy based colorants such as black, yellow, green, red, blue, white, and like colorants. Colorants used in this disclosure were from SP&S (Specialty Polymers and Service, see spolymers.com) and can include, e.g., Epoxicolor® 091 BLACK and Epoxicolor® 001 White.

The two exemplary films were prepared having the formulation components and amounts listed in Table 1. All of the components in the film were combined as monomeric components and then reacted to produce a thermally resistant film. Film HT-EIBF 1 is a polymer film having an anhydride end-capped polyimide mixed with a dense cross-linkable POSS monomer, which monomer can contain a high thermal resistant component, such as phenyl substituents.

The HT-EIBF-2 film was prepared with a 20 wt % of Cytonix 6298 to elevate the hydrophobicity of the film from a water contact angle of 89 to 112 degrees. The HT-EIBF-1 film had a measured voltage breakdown of 833 volts per micron and the HT-EIBF-2 film had a measured voltage breakdown of 1082 volts per micron. The formulations listed in Table 1 can be diluted, for example, into either PGMEA solvent or Vertrel MCA Plus, or blends of PGMEA and Vertrel MCA Plus, to control film thickness during deposition. The methods for deposition can include, for example: slot dye coating, spray coating (e.g., Sono-Tek), spin coating, dip coating, gravure coating, Optomec ink jet coating, wire-cater coating, i-CVD, and like methods.

Table 1 lists formulas by formula numbers (1 to 6) and components in weight percentages of reactants, ingredients, or structural constituents, that were used to prepare example disclosed barrier films (HT-EIBF 1 and HT-EIBF-2) without or free of nanosilica hardener of formula 6.

TABLE 1

Example barrier film reactants, constituents, and structural formula numbers.

| Formula><br>Example<br>Films | 1<br>e.g.,<br>FM3-6B<br>(anhydride<br>end-capped<br>polyimide) | 2<br>e.g.,<br>tetracyclo-<br>hexyl epoxy<br>phenyl<br>POSS | 3<br>e.g.,<br>Synasia<br>S100 | 4<br>e.g.,<br>EPCT | 5<br>e.g.,<br>Cytonix<br>6298 | 6<br>e.g.,<br>Nano-<br>silica | Initiator<br>A<br>e.g.,<br>UVI-<br>6976 | Initiator<br>B<br>e.g.,<br>Irgacure<br>819 |
|---|---|---|---|---|---|---|---|---|
| 1 (HT-EIBF 1) | 65% | 20% | 8% | 3% | 0% | 0% | 2% | 2% |
| 2 (HT-EIBF-2) | 52% | 16% | 6.4% | 2.4% | 20% | 0% | 1.6% | 1.6% |

Synasia S100, is a difunctional epoxy acrylate of formula 3, that has high temperature resistance and provides extensive crosslinking between epoxy groups and acrylate groups. Synasia S100 can also be substituted with "3,4-epoxycyclo-hexylmethyl-3,4-epoxycyclohexanecarboxylate" or Syna Epoxy 21 (UVR6110, ERL4221) when no acrylate containing groups are added. The free radical photo-initiator Irgacure 819 can be also substituted with Irgacure 1173 (aka.: "Darocur 1173").

Figure 4:
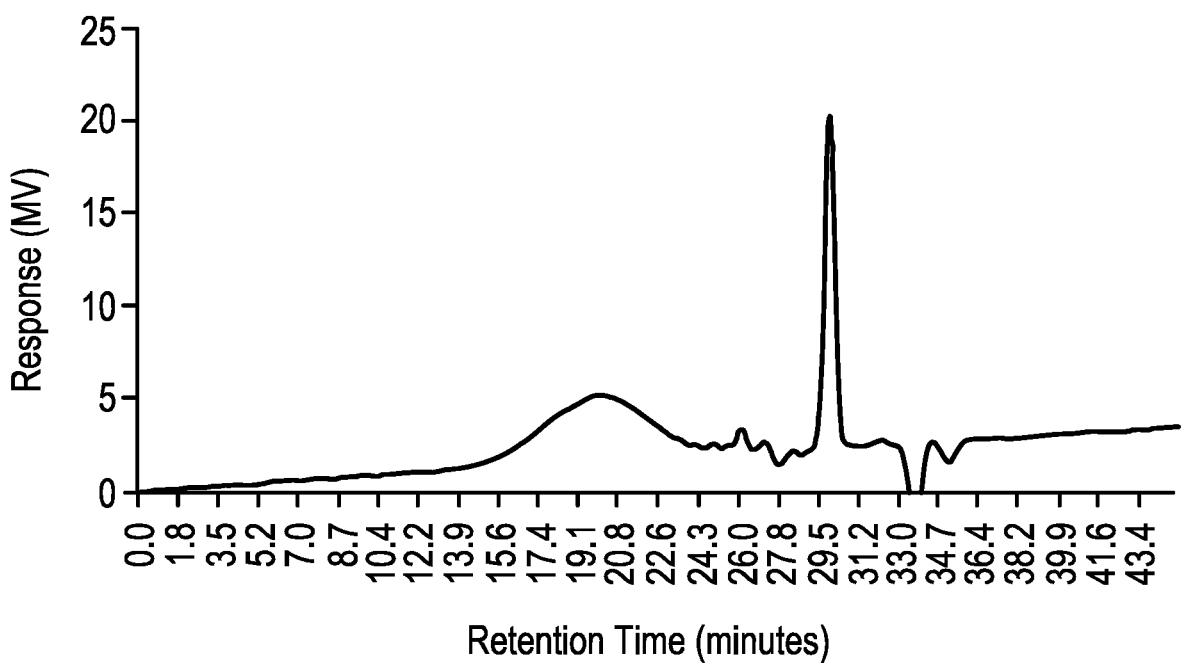
FIG. 4 shows poly-dispersity characterization results for a fluorinated anhydride end-capped polyimide.

Synthesis of Anhydride End-Capped Polyimide of Formula 1 This anhydride end-capped polyimide was prepared by a procedure similar to that reported by Ni (Ni, et al., A review on colorless and optically transparent polyimide films: Chemistry, process and engineering, J. Indust. and Enginer. Chem. 28, 2015. 16-27). Approximately 300 to 500 g of an NMP solution containing 30 to 40 wt % polyimide was prepared from the following materials: 100 g of Bis[4-(3-aminophenoxy)phenyl] sulfone (CAS#30203-11-3), mw=432.49 g/mol, and 100 g 4,4'-(hexafluoroisopropy-lidene) diphthalic anhydride, (CAS#1107-00-2), mw=444.24 g/mol, TCI Product Number H0771, 100 g. A small amount of toluene was added to keep the temperature down and to azeotrope and remove water generated in the reaction. The reaction was heated and cooled under argon to avoid objectionable color formation. The reaction took from 3 to 5 hrs to complete. An equimolar amount of the aromatic diamine and the dianhydride were combined in NMP at room temperature with thermal cooling and solvent evaporation. The resulting polyamic acid (PAA) was then heated under argon to about 300° C. until polymerization was completed with evaporation of solvent and completion of anhydride ring closure. FIG. 4 and the poly-dispersity characterization summarized in Table 3 indicated that the anhydride end-capped polyimide product has a poly-dispersity with one group of molecular weights around 79 KDa and other broad peaks of from 2 to 3 K Da. This anhydride end-capped polyimide rapidly dissolved in Vertrel MCA plus and PGMEA.

Thermal data TGA results for films were for a thermally stable capacitive touch sensor film that had a thermal resistance of greater than 240° C., a pencil hardness of about 7 H, an ability to be colored, a water contact angle of about 85 degrees, and a high voltage breakdown. The film begins to show weight loss at about 249 to 254° C. The two films differed only in the addition of colorants. These films also had high gloss when colored.

Synthesis of tetracyclohexyl epoxy phenyl POSS The following method was used to make the high temperature resistant POSS cross-linker. BaOH (0.19 g, solid catalyst) was added to S100 (6.16 g) and ECTS epoxy silane (6.16 g. 0.05 mol) in a 50 mL round bottom flask with a magnetic stirrer bar. The mixture was heated to 80° C. by immersion of the flask into an oil bath with a temperature controller. Diphenolsilanol DPSD (10.82 g., 0.05 mol) was added as a solid, portion wise, to the round bottom flask with a powder funnel. The solid dissolves almost immediately upon addition and was added over the span of 2 hrs in small quantities. The reaction was allowed to react for 2.5 hrs, then opened to the air to vent the methanol by-product. The mixture was allowed to cool to ambient by placing a cap on the round bottom flask to prevent contamination and further methanol evaporation.

Table 2 lists the differential scanning calorimetry (DSC) data for two exemplary polyimide films containing colorants. Note that both films show no mass loss until greater than 250° C. (see FIG. 7 and FIG. 8).

TABLE 2

DSC data for exemplary polyimide barrier films having colorants.

| Sample<br>Name | Total Weight<br>Loss (%) | Onset of Weight<br>Loss (° C.) | ExPC onset<br>(° C.) | ExPC peak<br>(° C.) |
|---|---|---|---|---|
| HT-EIBF 2<br>with Siepx-F<br>Black | 55.3 | 259 | 248 | 270 |
| HT-EIBF 2<br>with Siepx-F<br>White | 54.4 | 254 | 243 | 267 |

In embodiments, if desired, Tyzor adhesion promoters can also be used with these films. Similarly, films can also be made using thermal initiators rather than photoinitiators or a dual curing system can be used that includes a mixture of thermal initiators and photoinitiators.

Figure 3:
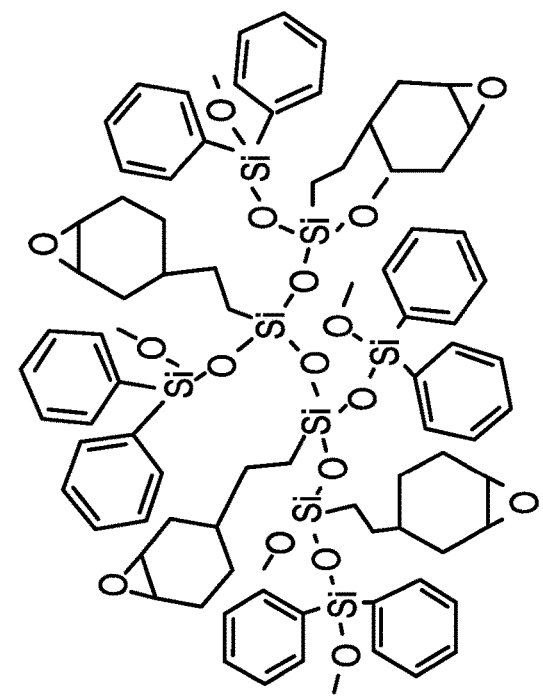
FIG. 3 shows exemplary source reactants or pre-polymerized structural components of a thermally stable film of the formula (I), i.e., HT-EIBF polyimide film 1, and without source reactants of formulas 5 and 6.
Figure 3:
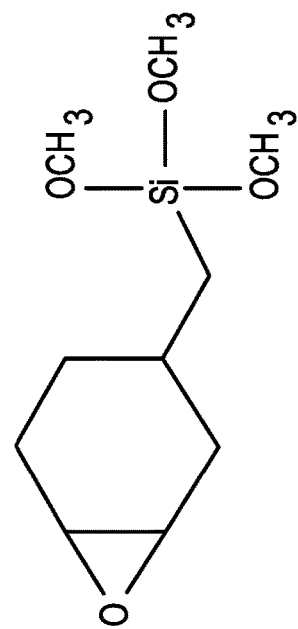
Figure 3:
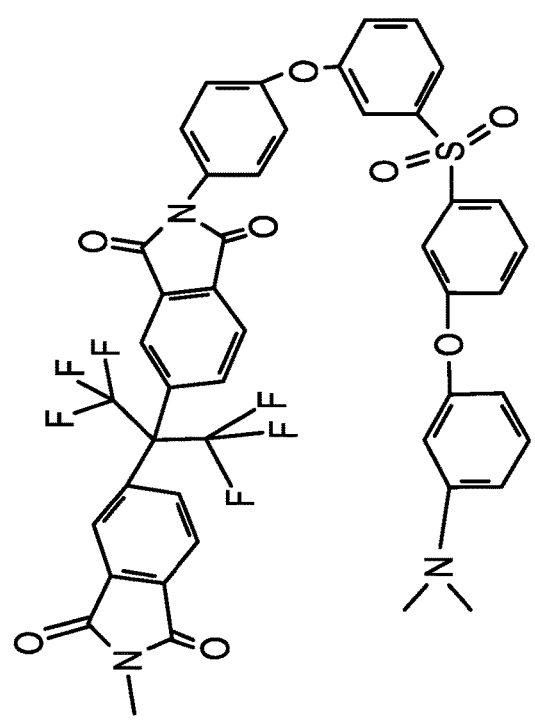
Figure 3:
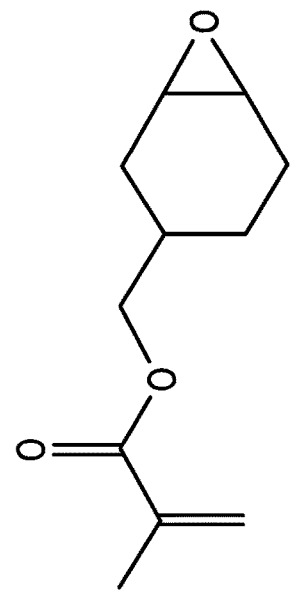

Molecular Spectroscopy and Separations—Chromatography GPC Molecular weight analysis and polydispersity of a solution of the anhydride end-capped polyimide of Formula 1 of FIG. 3. Experimental: The GPC system was a Waters Alliance e2695 Chromatography system equipped with a 2410 Waters Refractive Index Detector in positive polarity mode. A series of two Jordi gel mixed bed DVB columns, each 250×10 mm was used for separation. The column and detector temperatures were both held at 40° C. The mobile phase consisted of 0.03M LiBr, 0.03M $H_3PO_4$, and 1% THF in DMAc. An isocratic flow at 1 mL/min was maintained for the 45 min run time. Polystyrene standards ranging in size from 580 to 3,053,000 Da were prepared in a mobile phase resulting in a ten point calibration curve with an R2=0.993. Agilent EasyVial PS-H Tri PACK (PL2010-0202) standards were used to calibrate the analysis. The anhydride end-capped polyimide solution was diluted 1:145 gravimetrically with mobile phase. Injections of 100 microL were made of both standards and samples. Table 3 provides a summary of GPC analysis and molecular characterization of a solution of Designer Molecules anhydride end-capped polyimide of Formula 1 of FIG. 3. Mw and Mn are reported relative to polystyrene standards. PDI lists the polydispersity indices.

TABLE 3

GPC analysis and molecular characterization of the anhydride end-capped polyimide of Formula 1 of FIG. 3 material only.

| Formula 1 Anhydride capped polyimide Peak | Retention time | Mw | Mn | PDI |
|---|---|---|---|---|
| Peak 1 | 19.977 | 79287 | 30481 | 2.60 |
| Peak 2 | 24.949 | 3734 | 3706 | 1.01 |
| Peak 3 | 26.179 | 2051 | 2024 | 1.01 |
| Peak 4 | 29.979 | — | — | — |

The anhydride end-capped polyimide of Formula 1 of FIG. 3 had very wide polydispersity for the main peak 1, multiple secondary peaks, e.g., peaks 2 and 3, and a large amount of material that falls outside of the calibration curve as a single low molecular weight peak. Peak 4, at retention time (RT) 29.979, may be residual starting material or an intermediate reaction product that has not been fully polymerized. While the software will not estimate Mw for the material that falls outside of the calibration curve, applying the tread line formula estimates peak 4 to have an Mw of just below 300.

In embodiments, the halogenated polyimide of the formula 1 such as a fluorinated polyimide, can be prepared from a polyamic acid, which can be formed in a solution by the polymerization of the monomers. One such polyamic acid is NOVASTRAT™ 800 (available from NeXolve). A curing step imidizes the polyamic acid to form the polyimide. The polyamic acid may be formed from the reaction of a diamine monomer, such as a diamine, and an anhydride monomer, such as a dianhydride. As used herein, polyimide monomers are described as diamine monomers and dianhydride monomers. However, while a diamine monomer comprises two amine moieties any monomer comprising at least two amine moieties can be suitable as a diamine monomer. Similarly, while a dianhydride monomer comprises two anhydride moieties any monomer comprising at least two anhydride moieties can be suitable as a dianhydride monomer. The reaction between the anhydride moieties of the anhydride monomer and amine moieties of the diamine monomer forms the polyamic acid. Generally, the molar ratio of the total anhydride monomers and diamine monomers can be, for example, about 1:1. While the polyimide can be formed from only two distinct chemical compositions (one dianhydride monomer and one diamine monomer), at least one dianhydride monomer can be polymerized and at least one diamine monomer can be polymerized to from the polyimide. For example, one anhydride monomer can be polymerized with two different diamine monomers. Any number of monomer specie combinations can be used. Furthermore, the ratio of one anhydride monomer to a different anhydride monomer, or one or more diamine monomer to a different diamine monomer can be any ratio, such as from about 1:0.1 to 0.1:1, such as from about 1:9, 1:4, 3:7, 2:3, 1:1, 3:2, 7:3, 4:1 or 1:9. Other suitable dianhydride monomers and diamine monomers are disclosed in the abovementioned commonly owned and assigned U.S. Pat. No. 9,744,099.

The dianhydride monomer can comprise any suitable dianhydride monomer. In embodiments, the dianhydride monomer can have, e.g., a benzophenone core structure. In an exemplary embodiment, benzophenone-3,3',4,4'-tetracarboxylic dianhydride can be at least one dianhydride monomer from which the end-capped polyimide of formula 1 is formed. In embodiments, the dianhydride monomer is preferably fluorinated, i.e., contains one or more fluorine (F) atoms.

The diamine monomer can comprise any diamine monomer. In embodiments, the diamine monomer can have at least one aromatic ring moiety. Table 4 shows an example of a diamine monomer that can react with one or more anhydride monomers to form the halogenated (i.e., fluorinated) polyimide of formula 1. The diamine monomer can have, for example, one or more carbon atoms connecting two aromatic ring moieties together. Alternatively, the diamine monomer can have two aromatic ring moieties that are directly connected and not separated by at least one carbon atom. The diamine monomer can have, for example, one or more non-carbon atoms such as —SO2—, —NR— (where R is e.g., alkyl), —O—, and like heteroatoms. The diamine monomer can have one or more alkyl moieties such as methyl, ethyl, propyl, or butyl moieties, connected to one or more aromatic ring moieties. For example, the diamine monomer may have two aromatic ring moieties where each aromatic ring moiety has an alkyl moiety connected thereto and an adjacent amine moiety connected to the aromatic ring moiety.

In embodiments, the diamine monomer can have, for example, an anthracene core structure, a phenanthrene core structure, a pyrene core structure, a pentacene core structure, and like core structures, including substituted versions.

Two different diamine monomers can be selected to form the polyimide. In embodiments, a first diamine monomer can have, for example, two aromatic ring moieties that are directly connected and not separated by a linking carbon atom, and a second diamine monomer can have, for example, two aromatic ring moieties that are connected with at least one carbon atom. In embodiments, the first diamine monomer, the second diamine monomer, and the anhydride monomer can have, for example, a mole ratio (first diamine monomer:second diamine monomer:anhydride monomer) of about 0.25:0.25:0.5. However, the mole ratio of the first diamine monomer and the second diamine monomer can vary, for example, of from about 0.01:0.49 to from about 0.49:0.01, and the anhydride monomer ratio remains at about 0.5.

In embodiment, the halogenated polyimide can be formed from the polymerization of at least a first diamine monomer, a second diamine monomer, and an anhydride monomer containing halogen atoms, wherein the first and second diamine monomers are different compounds. In embodiments, the dianhydride monomer can be, for example, a benzophenone, the first diamine monomer can be, for example, two aromatic rings directly bonded together, and the second diamine monomer can be, for example, two aromatic rings bonded together with at least one carbon atom or suitable heteroatom connecting the first and second aromatic rings.

In an exemplary embodiment, the first diamine monomer is ortho-toluidine, the second diamine monomer is 4,4'-methylene-bis(2-methylaniline), and the dianhydride monomer can be, for example, benzophenone-3,3',4,4'-tetracarboxylic dianhydride, 4,4'-(hexafluoroisopropylidene) diphthalic anhydride, and like dianhydrides, or mixtures thereof.

Other films were prepared by adding, for example, a nanosilica compound of formula 6 to the formulations used to make the films of Examples 1 and 2 to increase hardness of the film. Epoxy colorants, such as white or black, were added to the formulation mixture to prepare colored films.

Table 4 (see also FIG. 2) lists representative formulas by formula numerals of starting materials or components used to prepare the disclosed representative barrier film.

TABLE 4

Barrier film reactants by formula numbers and chemical formulas.

| Formula | Exemplary partial or complete chemical structures |
|---|---|
| 1 | Halogenated polyimide product formed by the reaction of a fluorine containing dianydride and a diamine, e.g.,: 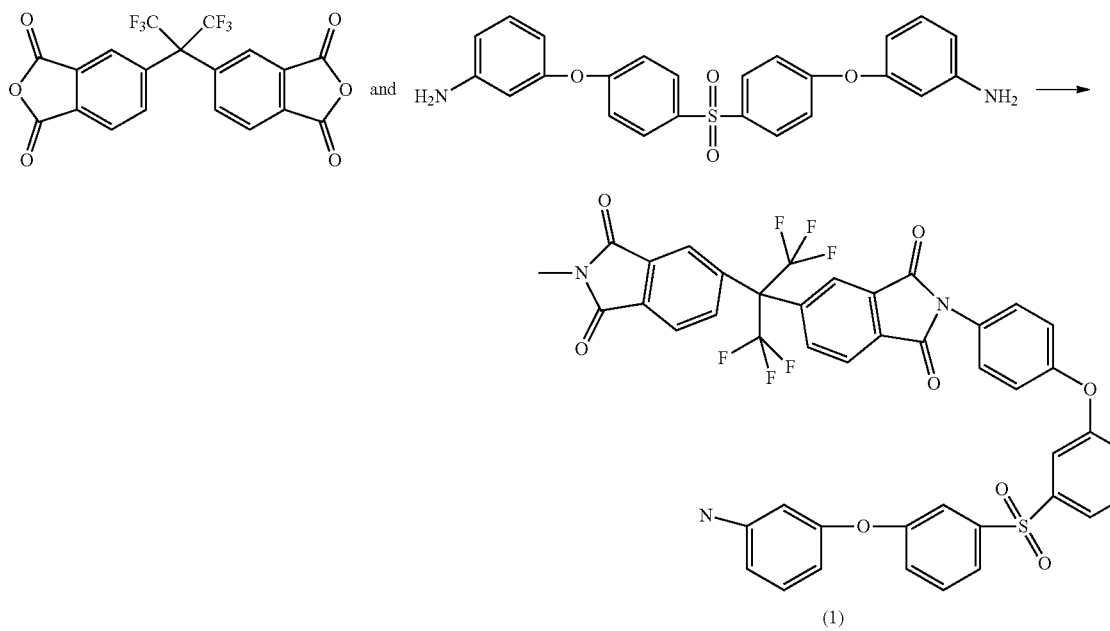 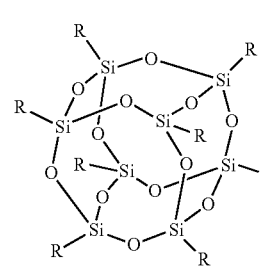 (1) <br> 4,4'-(Hexafluoroisopropylidene) diphthalic anhydride, e.g., of repeat unit in formula (1) (anhydride end groups not shown) |
| 2 | 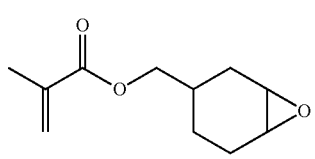 <br> Reactive group modified POSS where at least one of the R substitutents includes, e.g., an epoxy, an acrylate, a phenyl, a benzyl, and like moieties. |
| 3 | $\{CH_2{=}CH{-}C({=}O)O{-}\}_a{-}R_2\{CH{=}(O){=}CH\}_b$ where $R_2$ is a cyclic hydrocarbon or an alkyl subsituted cyclic hydrocarbon, and a and b are each the number of acrylate or epoxy groups, for example, of from 1 to 3, e.g., a difunctional epoxy acrylate of the formula: 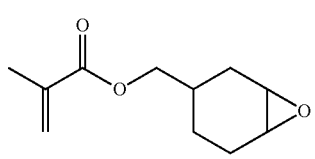 |
| 4 | $\{CH{=}(O){=}CH\}_b{-}R_2{-}Si(OR)_3$ where R is $C_{1-3}$ alkyl, $R_2$ is a cyclic hydrocarbon or an alkyl substituted cyclic hydrocarbon, and b is the number of epoxy groups, for example, of from 1 to 3, e.g., a difunctional epoxy siloxane tie agent or coupling agent (e.g., EPCT) of the formula: |

TABLE 4-continued

Barrier film reactants by formula numbers and chemical formulas.

| Formula | Exemplary partial or complete chemical structures |
|---|---|
| | 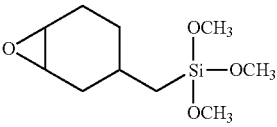 [SMILES: CO[Si](CC1CCC2OC2C1)(OC)OC] |
| 5 | fluorinated urethane-acrylate (fluorinated urethane acrylate, e.g., Cytonix 6298 where X is a proprietary divalent urethane group, and m, n, and q are integers (aka.: Cytonix Fluoro Acryl 6298) of the formula 5A: $\{(CH_2=CHC(=O)CH_2)\}_3C-X-O(CH_2CH_2O)_pCH_2CF_2O(CH_2CH_2O)_m(CF_2O)_nCF_2CH_2(OCH_2CH_2)_qO-X-C\{CH_2C(=O)CH=CH_2\}_3$ a fluorinated urethane-epoxy of formula 5B: $\{(CH_2=(O)=CHC(=O)CH_2)\}_3C-X-O(CH_2CH_2O)_pCH_2CF_2O(CH_2CH_2O)_m(CF_2O)_nCF_2CH_2(OCH_2CH_2)_qO-X-C\{CH_2C(=O)CH=(O)=CH_2\}_3$ |
| 6 | Epoxy (6A) or acrylate (6B) surface modified nano-silica compound of the formulas: $\{CH_2=(O)=CH\}_b-\{SiO_x\}$ 6A $\{CH_2=CH-C(=O)O-\}_a-\{SiO_x\}$ 6B where a or b is the number of epoxy or acrylate groups, for example, of from 1 to 50, and {SiO} represents the approximate total $SiO_2$ in the nano-silica particle. |
| Init A | Free radical initiator, e.g., 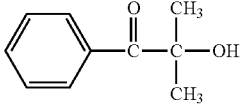 |
| Init B | UV initiators, e.g., 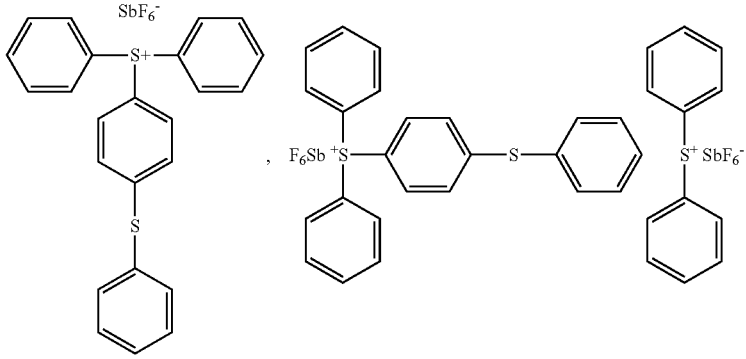 |

In embodiments, one can select as the surface modified nano-silica compound of the formula 6, for example, a nanosilica Dispersion POSS compositions from Hybridplastics.com having, for example, of the empirical formula $(C_6H_{11}O_2)_n(SiO_{1.5})_n$. One example is EP4F09.01 Nanosilica Dispersion Epoxy POSS, which is two reinforcing agents in one, i.e., a reactive group modified silsesquioxane and a nanosilica. One silsesquioxane hybrid is EP0409 having a 1.5 nm molecule of an inorganic silsesquioxane as the core cage, and organic glycidyl groups attached at the corners of the cage. The hybrid acts as a multifunctional crosslinker. 30 weight percent of 20 nm nanosilica is completely dispersed into the EP0409 glycidyl modified silsesquioxane, creating a clear, colorless liquid, which is easily blended into other systems. Another example of formula 6 is POSS Resin EP3510, which is a POSS based, ultra high-temperature epoxy resin. The POSS content in EP3510 offers unique properties such as high thermal stability, outstanding oxygen resistance and chemical resistance.

In embodiments, nanosilica POSS compounds of formula 6 can include, for example: an EP0408—Epoxycyclohexyl POSS Cage Mixture; an EP3512—POSS Resin; a MA0735—Methacryl POSS Cage Mixture, and like POSS compounds of formula 2.

Other suitable commercially available POSS polyimides are, for example, CORIN—Transparent, POSS® ImiClear, Thermalbright™ Polyimide, and NeXolve's CORIN XLS Polyimide (fluorinated polyimide nanocomposite) (see hybridplastics.com/wp-content/uploads/sites/57/2015/04/CORIN.pdf).

Figure 1:
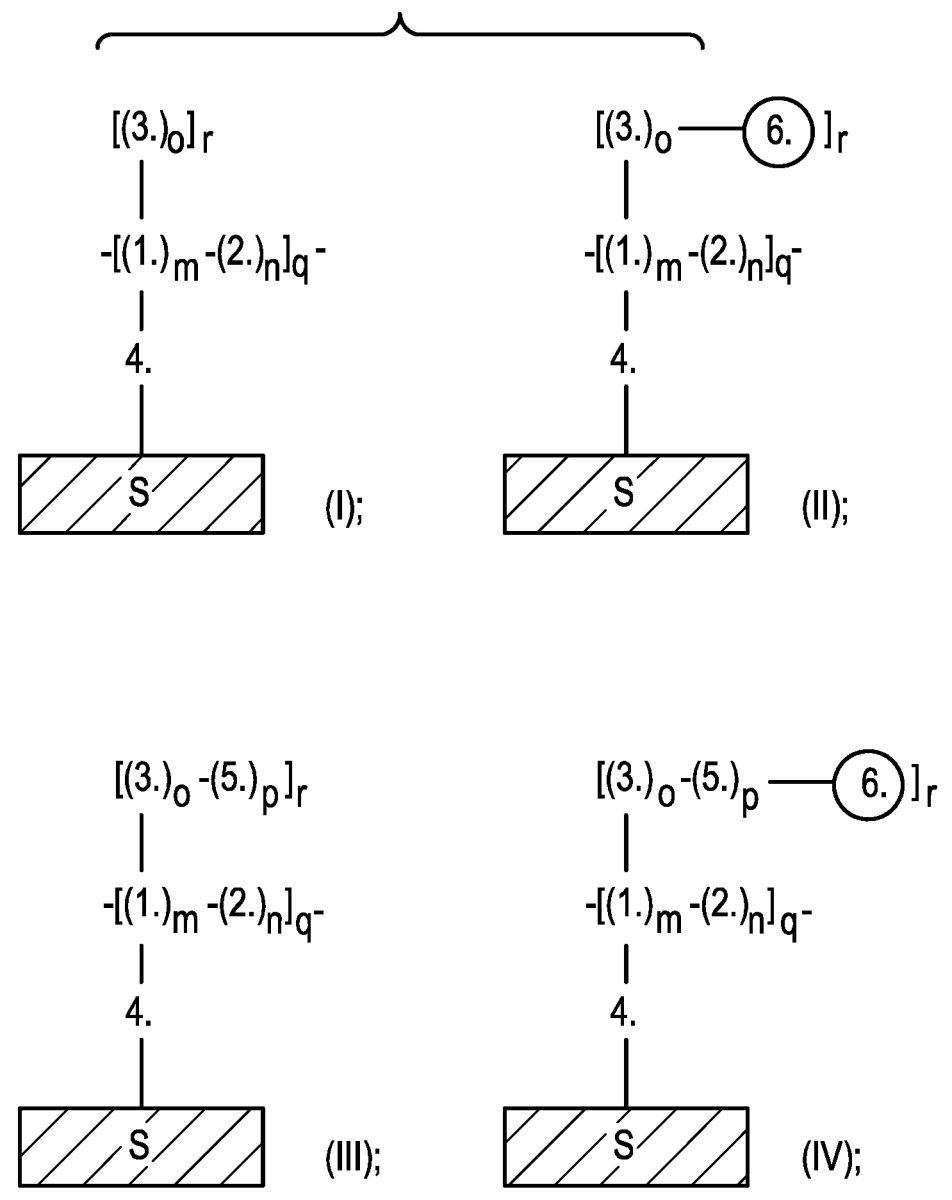

Referring to the Figures, FIG. 1 shows schematics of exemplary barrier films of formulas (I), (II), (III), and (IV).

FIG. 2 shows exemplary source reactants or pre-polymerized structural components of a thermally stable film of the formula (IV) of FIG. 1.

FIG. 3 shows exemplary source reactants or pre-polymerized structural components of a thermally stable film of the formula (I), i.e., HT-EIBF polyimide film 1, and without source reactants of formulas 5 and 6. Initiators not shown. These components were dissolved into PGMEA and spin coated onto electrodes for voltage breakdown testing after curing. The curing of the resulting film used a xenon arc lamp for 2 mins under nitrogen. EPCT is a silane containing glass adhesion promoter (of formula 4) that was added into the mixture but can be substituted by other suitable adhesion promoters. In embodiments, the surface or substrate, alternatively or additionally, can be pre-treated with the adhesion promoter of formula 4 to provide strong adhesion of the film to the surface.

FIG. 4 shows the poly-dispersity characterization of an anhydride end-capped polyimide using a chromatogram of an anhydride end-capped polyimide solution from Designer Molecules of Formula 1 in FIG. 3.

Figure 5:
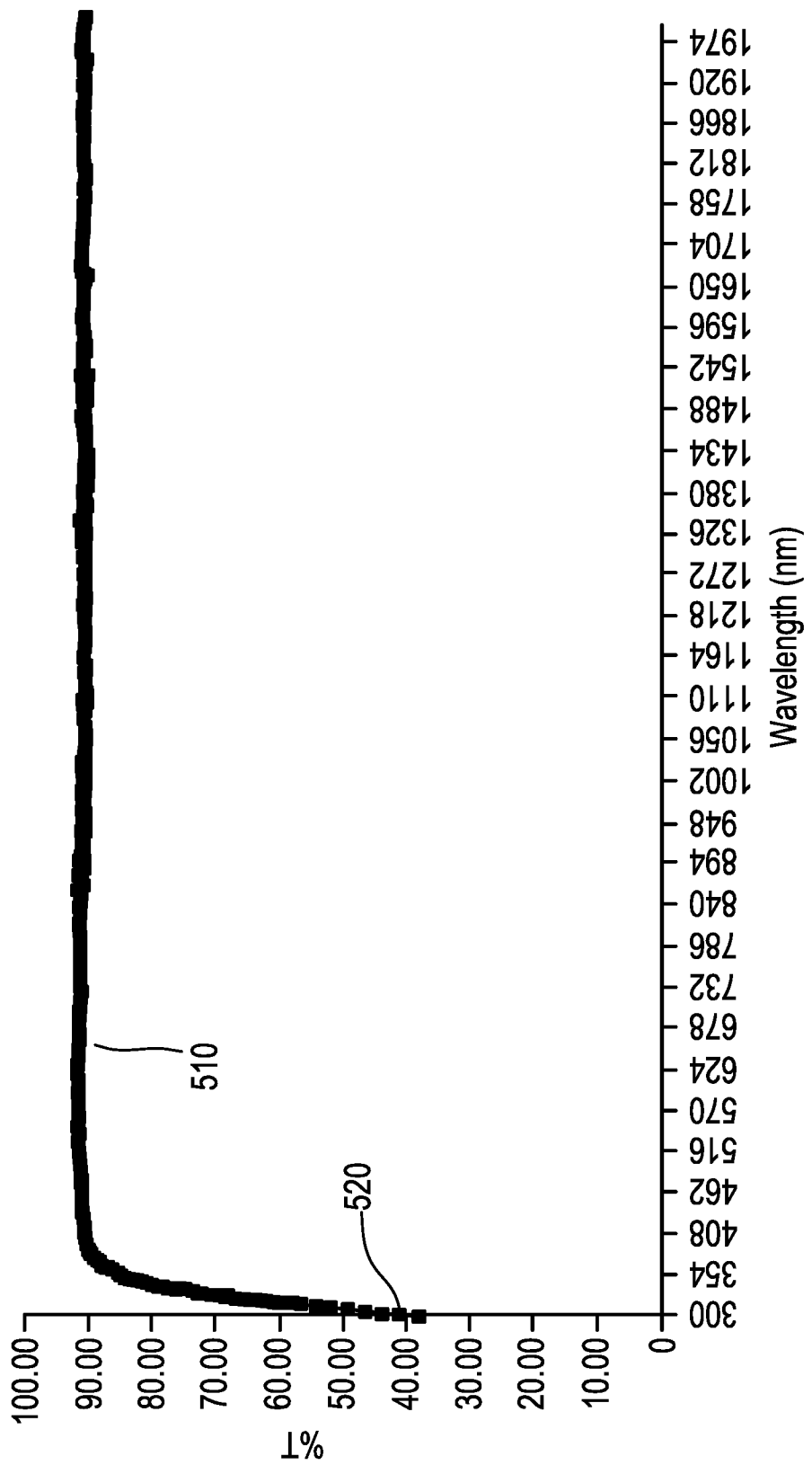
FIG. 5 shows the optical transmittance (% T) of an exemplary polyimide film 1 (HT-EIBF 1) on a glass substrate compared to the glass substrate.

FIG. 5 shows the optical transmittance (% T) of an exemplary polyimide film 1 (HT-EIBF 1) on a glass substrate. Note the film coating % transmittance in the visible region is highly uniform. The polyimide film is colorless when spin coated. The overlapping curves or nearly coincident are an EXG glass blank reference (510) and a HHTS polyimide coating on EXG glass (520).

Figure 6:
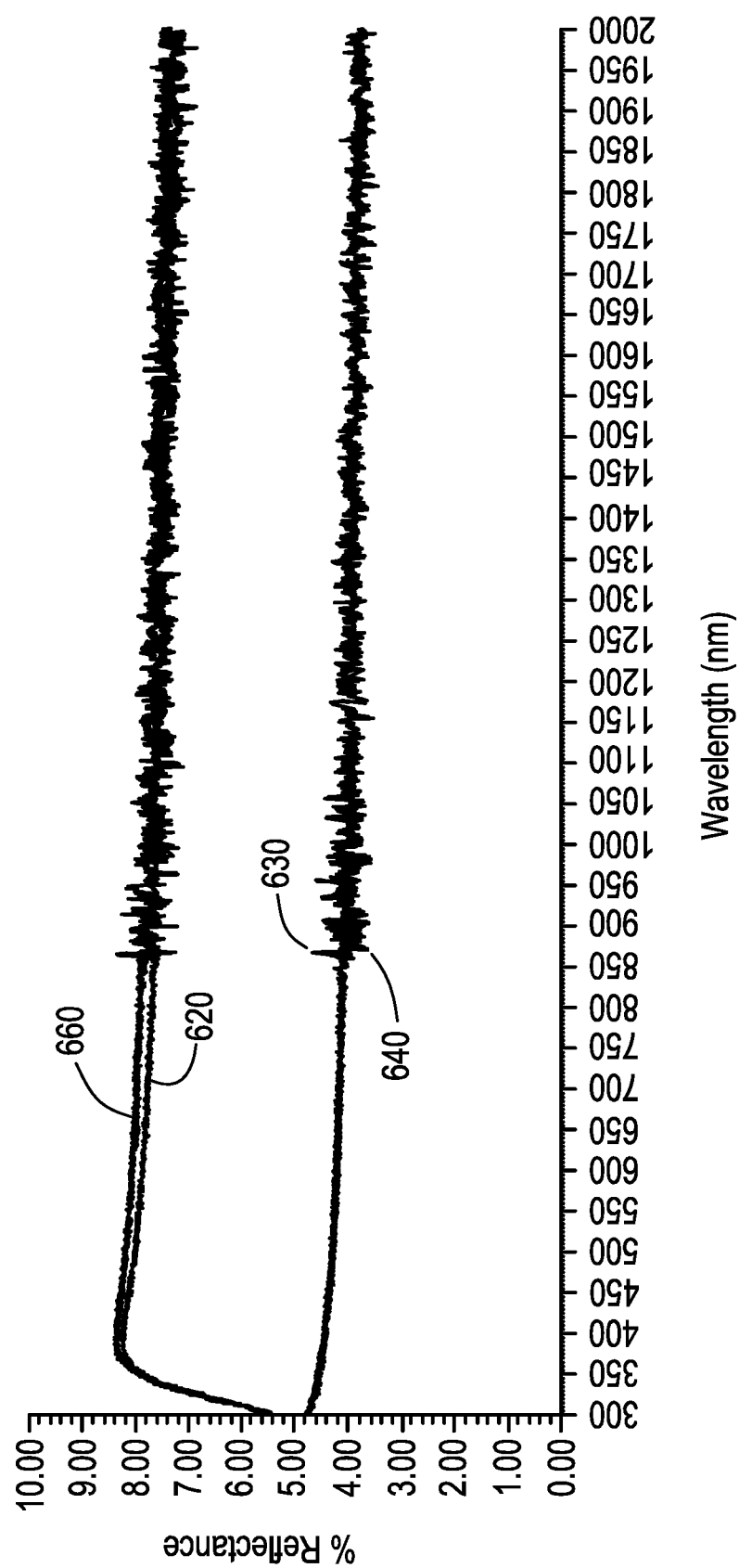
FIG. 6 shows the % reflectance for two separately tested exemplary polyimide films on an EXG® glass substrate compared to the glass substrate.

FIG. 6 shows the % reflectance for two separately tested exemplary polyimide films on an EXG® glass substrate (upper curves: HHTS polyimide coating on EXG glass (2-surface reflectance) (610) compared to EXG glass blank control (620) (2-surface)); and (lower curves: HHTS polyimide coating on EXG glass (630) (1-surface) compared to EXG glass blank (640) (1-surface reflectance)).

Figure 7:
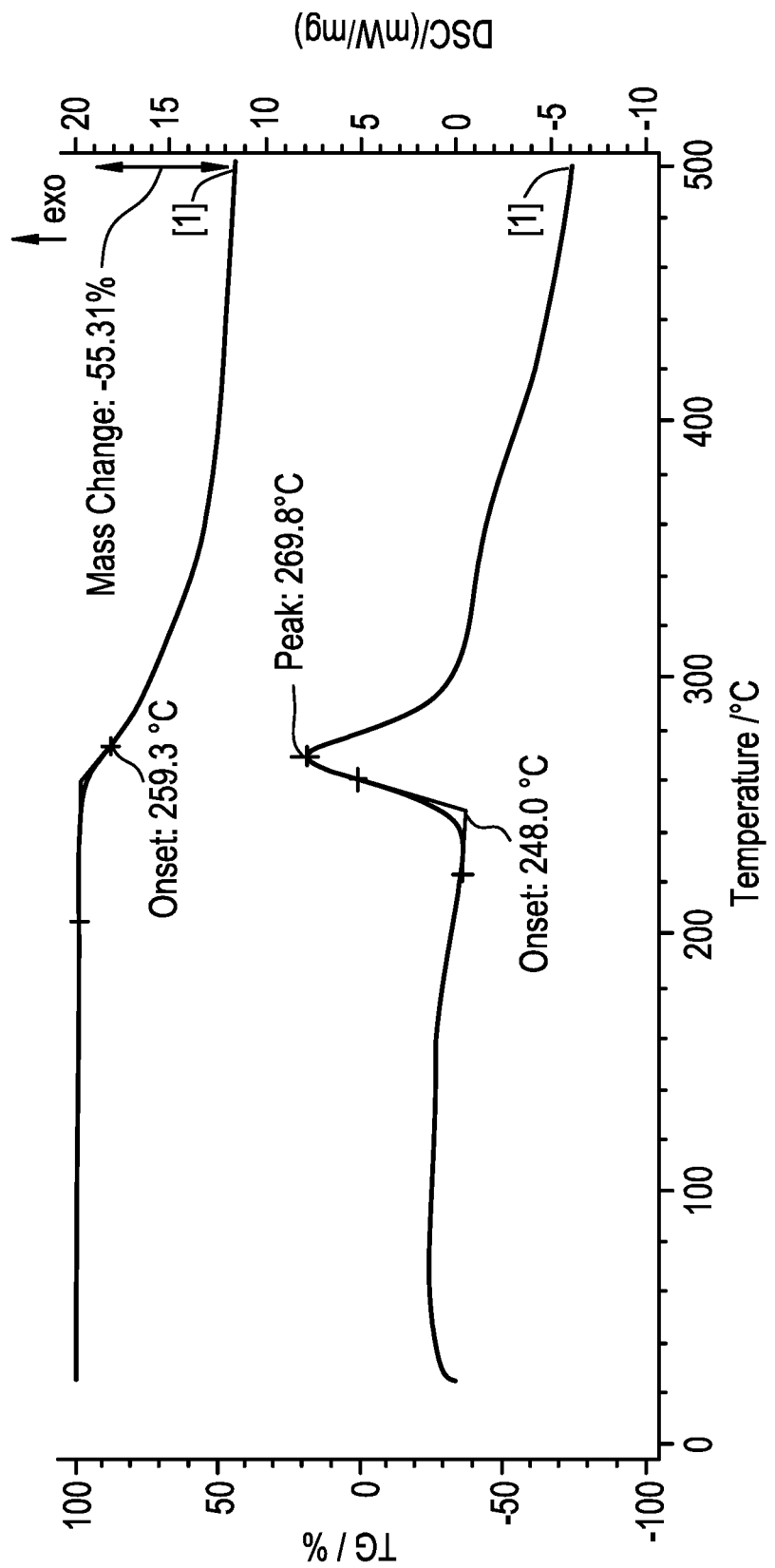
FIG. 7 shows a thermal transition via TGA analysis for black colored epoxy polyimide film.

FIG. 7 shows a thermal transition via TGA analysis for black colored epoxy polyimide film. The base matrix was selected, i.e., HT-EIBF polyimide film, and a small amount of epoxy silica (5 wt %) and black epoxy colorant (1 wt %) was added, and then a spin coated film was made.

Figure 8:
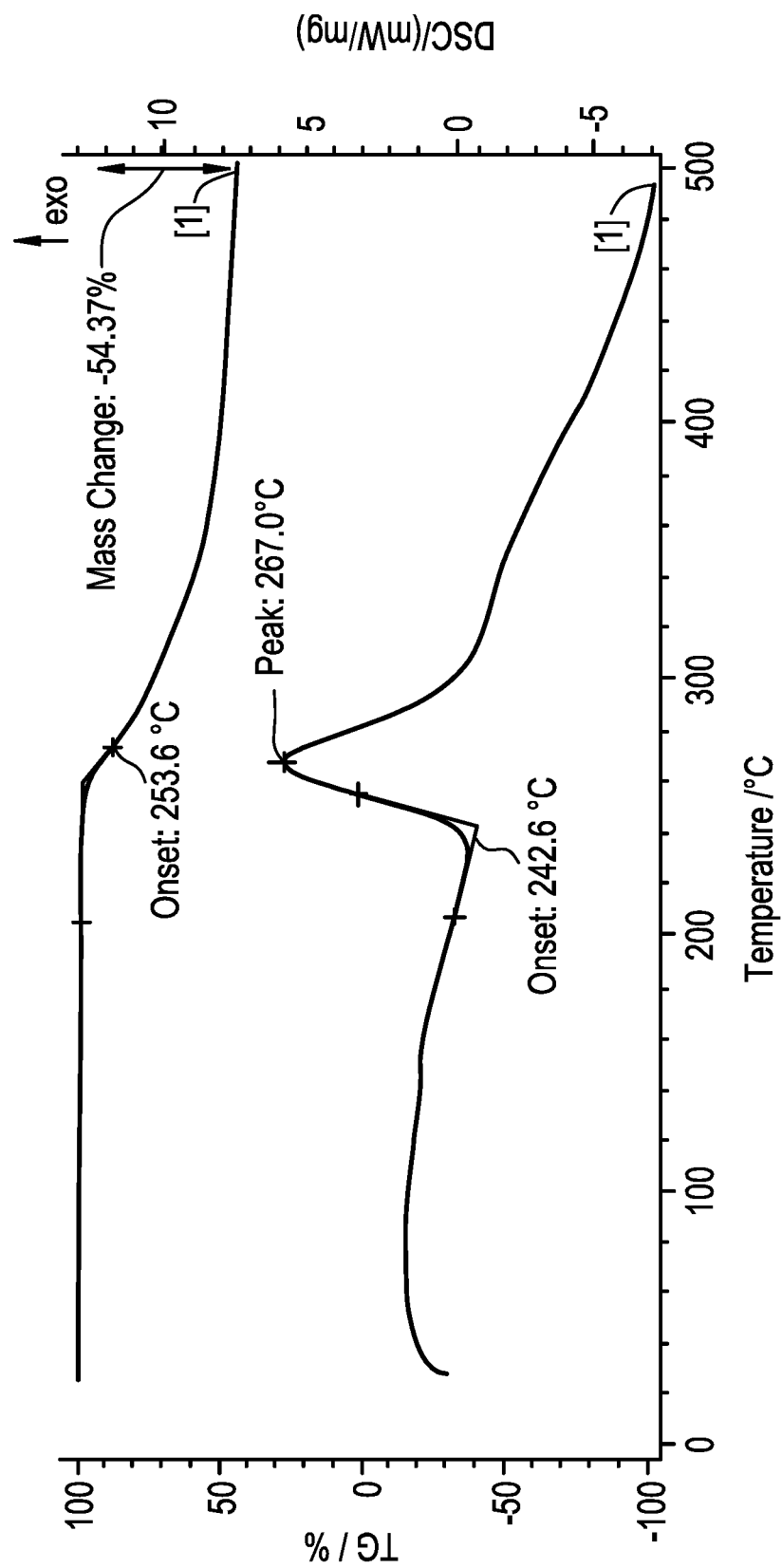
FIG. 8 shows a thermal transition via TGA analysis for uncolored (i.e., white) epoxy polyimide film.

FIG. 8 shows a thermal transition via TGA analysis for a white pigmented epoxy polyimide film. The base matrix was selected, i.e., HT-EIBF polyimide film, and a small amount of epoxy silica (5 wt %) and white epoxy colorant (1 wt %) was added, and then a spin coated film was made.

Figure 9:
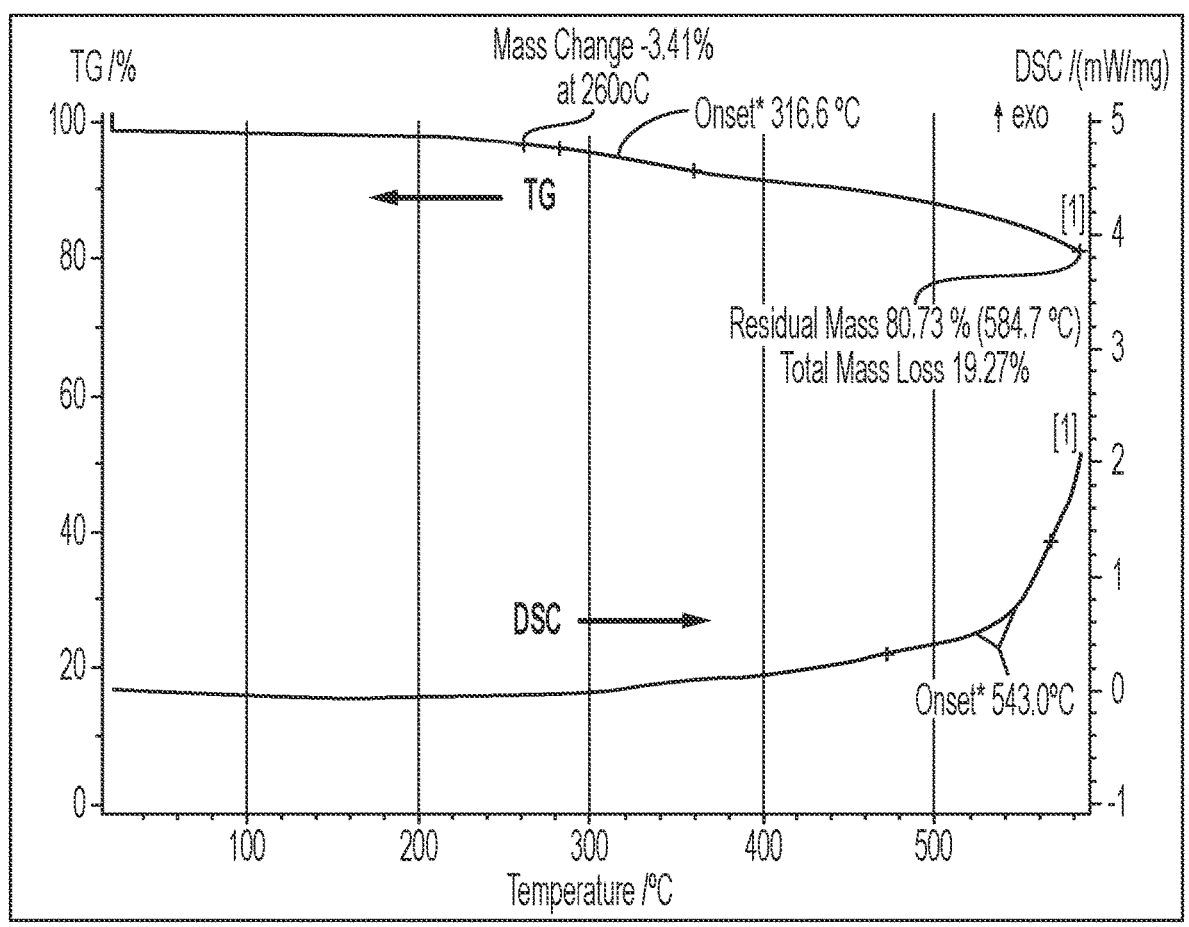
FIG. 9 shows a thermal transition via TGA analysis for 80% epoxy polyimide film and a Glycidyl POSS crosslinker.
Figure 10:
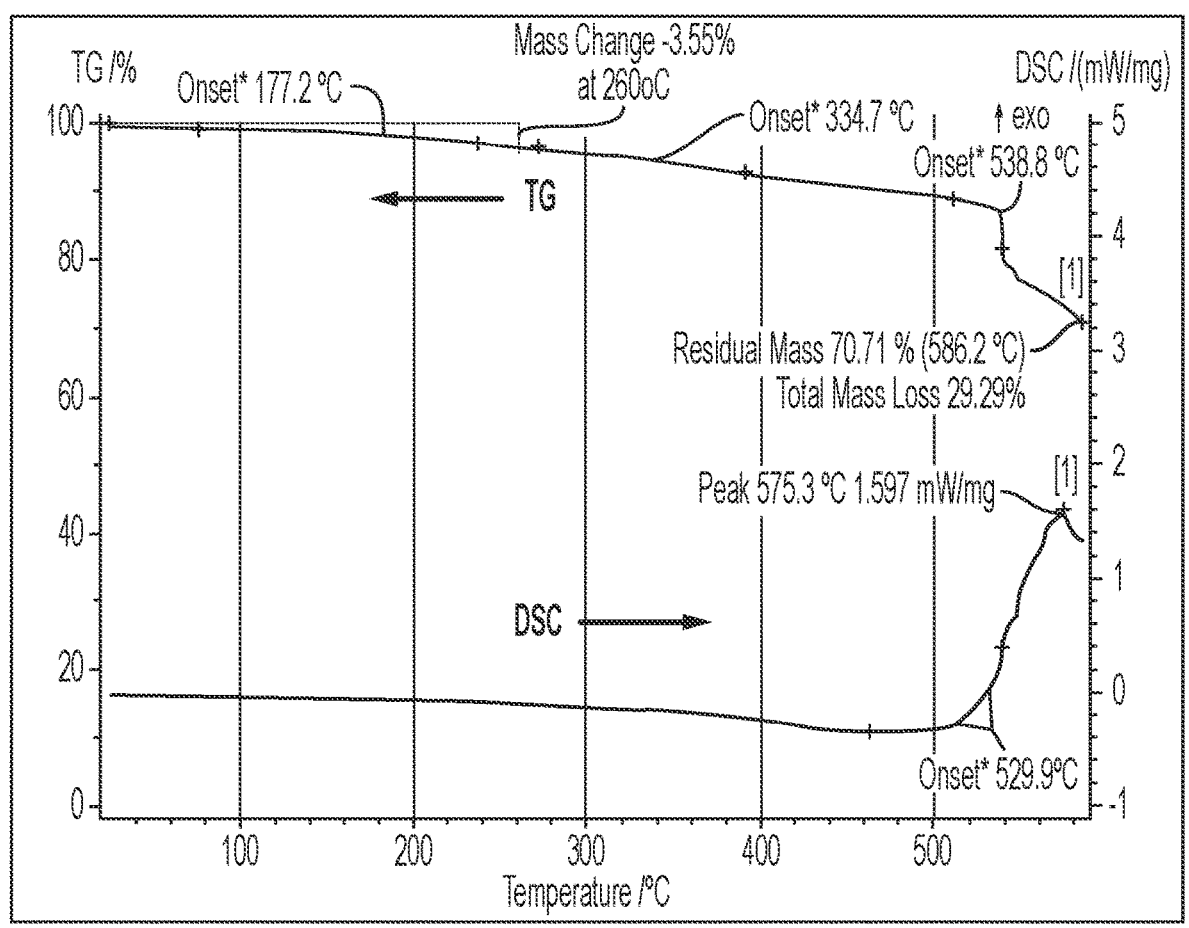
FIG. 10 shows a thermal transition via TGA analysis for 80% epoxy polyimide film and a bisphenol S diglycidyl ether (BADGE) crosslinker.

FIGS. 9 and 10 show thermal transitions via TGA analysis for epoxy polyimide films. The base matrix was selected, i.e., HT-EIBF polyimide film (80%), a small amount of epoxy silica as a stiffening agent, and at least one of a crosslinker (e.g., bisphenol S diglycidyl ether (BADGE), Glycidyl POSS, etc.). Specifically, FIG. 9 shows a thermal transition via TGA analysis for 80% epoxy polyimide film and a Glycidyl POSS crosslinker and FIG. 10 shows a thermal transition via TGA analysis for 80% epoxy polyimide film and a bisphenol S diglycidyl ether (BADGE) crosslinker. A spin-coated film was then made from the mixture.

Using the POSS crosslinker, FIG. 9 illustrates a continuous drift due to solvent leaving (flash-off) so there is no sharp Tg transition. Moreover, only about a 3.4 wt. % loss is seen at approximately 260° C. Using the BADGE crosslinker, FIG. 10 illustrates only about a 3.6 wt. % loss is seen at approximately 260° C. In both FIGS. 9 and 10, the quantity of polyimide film (80%) contributes to the film having a Tg being higher than about 258° C.

Table 5 below lists the differential scanning calorimetry (DSC) data for two exemplary polyimide films containing 80 wt. % polyimide. Note that both films show no mass loss greater than about 30 wt. %.

TABLE 5

DSC data for exemplary polyimide barrier films.

| Sample Name | Total Weight Loss (%) | Onset of Weight Loss (° C.) | ExPC onset (° C.) | ExPC peak (° C.) |
|---|---|---|---|---|
| HT-EIBF 2 with BADGE | 29.3 | 316.6 | 529.9 | 575.3 |
| HT-EIBF 2 with POSS | 19.3 | 177.2, 334.7, and 538.8 | 543.0 | — |

EXAMPLES

The following Examples demonstrate making, use, and analysis of the disclosed films and methods in accordance with the above general procedures.

Example 1

Preparation of Barrier Film (HT-EIBF-1) The ingredients (by weight) listed in Table 1, Example Film 1, were mixed together, diluted with, for example, propylene glycol methyl ether acetate (PGMEA) solvent, Vertrel MCA Plus (a proprietary azeotrope of Vertrel™ XF, trans-1,2 dichloroethylene and cyclopentane from Chemours), or mixtures thereof. The amount of solvent included in the mixture can be used to control or determine film thickness, for example: 90 vol % to 10 vol % solvent for an 8 micron thick film; and 200 vol % to 10 vol % solvent for a 2 micron thick film. The mixture was vortex stirred in a capped brown bottle for 1 to 48 hrs. The resulting mixture was irradiated with a xenon arc UV source to activate the photoinitiator, for example, about 60 seconds. The resulting mixture was spin coated under various conditions to provide films having thicknesses, for example, of from 1 to 8 microns. The spun film was placed on a hot plate at from 40 to 60° C. for about 30 seconds to activate the thermal initiator. The resulting barrier film of Example 1 had a measured voltage breakdown of 833 Volts/micron, a thickness of 421 nm, and a water contact angle of 82.5° at a voltage of 351 Volts at breakdown.

Example 2

Preparation of Barrier Film (HT-EIBF-2) Example 1 was repeated with the exception that the ingredients listed in Table 1, Example 2, were mixed together. The barrier film of Example Film 2 had a measured voltage breakdown of 1082.0 Volts/micron, a thickness of 183 nm, and a water contact angle of 111.1 at a voltage of 198 Volts at breakdown.

Example 3

Preparation of Nanosilica Enhanced Barrier Film Example 1 was repeated with the exception that the Example 1 or Example 2 ingredients listed in Table 1, were each separately mixed together and each mixture further included a surface modified nano-silica compound of formula 6 in an amount of from 2 to 5 wt %.

Example 4

Preparation of Colored Barrier Film Example 3 was repeated with the exception that the ingredients for the respective mixtures further included either a white or black epoxy colorant in amounts of from 1 to 5 wt %. TGA/DSC analysis for the black colored film in FIG. 7 indicated that no mass loss occurs until 259.3° C. and had a pencil hardness was 7 H and 8 H.

Example 5 (Prophetic)

Preparation of a Liquid Lens Array A liquid lens array is constructed with any of the abovementioned barrier films as the insulating layer using method described in, for example, US 2015/0070779, such as a substitute for Parylene™ C.

The disclosure has been described with reference to various specific embodiments and techniques. However, many variations and modifications are possible while remaining within the scope of the disclosure.

What is claimed is:

1. A thermoset barrier film, comprising:
a reaction product comprising:
a fluorinated polyimide oligomer having anhydride end caps, in from 50 to 90 wt %;
a cross-linker, in from 1 to 40 wt %, comprising a polyhedral oligomeric silsesquioxane having at least one pendant group selected from an epoxy group, a di-aryl group, an acrylate group, or mixtures thereof;
a tie agent having at least one of each of an acrylate group and an epoxy group, in from 0.1 to 20 wt %;
an epoxy silane adhesion promoter, in from 0.1 to 3 wt %; and
an initiator, in from 1 to 20 wt %, based on a total of 100 wt % of the barrier film,
wherein the barrier film is electrically isolating and has a voltage breakdown of from 300 to 1900 volts per micron,
wherein the barrier film is thermally stable up to at least 250° C. with no loss in mass below 250° C., and
further wherein the barrier film has a water contact angle of from 89 degrees to 112 degrees.

2. The barrier film of claim 1, further comprising:
a surface modified nano-silica having a primary particle size of from about 10 nm to 20 nm in a total amount of from 5 to 30 wt % by superaddition, wherein the barrier film has a pencil hardness of at least 7 H.

3. The barrier film of claim 2, wherein the cross-linker is in from 8 to 40 wt %.

4. The barrier film of claim 1, further comprising:
at least one fluorine booster compound selected from a fluorinated urethane-acrylate of formula, a fluorinated epoxy, or a mixture thereof, in a total amount of from 0.1 to 30 wt % by superaddition.

5. The barrier film of claim 4, wherein the fluorinated polyimide oligomer is in from 50 to 54 wt %, the cross-linker is in from about 14 to 18 wt %, the tie agent is in from about 5 to 8 wt %, the epoxy silane adhesion promoter is in from about 1.5 to 4 wt %, and the initiator is in from about 2 to 5 wt %, and further wherein the at least one fluorine booster compound is in from about 15 to 30 wt % by superaddition.

6. The barrier film of claim 5, wherein the barrier film is electrically isolating and has a voltage breakdown of from 1000 to 1200 volts per micron, and further wherein the barrier film has a water contact angle of at least about 112 degrees.

7. The barrier film of claim 1, wherein the fluorinated polyimide oligomer is in from 62 to 68 wt %, the cross-linker is in from about 17 to 23 wt %, the tie agent is in from about 6 to 10 wt %, the epoxy silane adhesion promoter is in from about 1.5 to 4.5 wt %, and the initiator is in from about 3 to 6 wt %.

8. The barrier film of claim 7, wherein the barrier film is electrically isolating and has a voltage breakdown of from 750 to 900 volts per micron.

9. A pourable formulation for a thermoset barrier film, comprising:
a solvent or a liquid vehicle; and
a reaction product dissolved in the solvent or suspended in the liquid vehicle,
wherein the reaction product comprises:
a fluorinated polyimide oligomer having anhydride end caps, in from 50 to 90 wt %;
a cross-linker, in from 1 to 40 wt %, comprising a polyhedral oligomeric silsesquioxane having at least one pendant group selected from an epoxy group, a di-aryl group, an acrylate group, or mixtures thereof;
a tie agent having at least one of each of an acrylate group and an epoxy group, in from 0.1 to 20 wt %;
an epoxy silane adhesion promoter, in from 0.1 to 3 wt %; and
an initiator, in from 1 to 20 wt %, based on a total of 100 wt % of the barrier film.

10. The formulation of claim 9, further comprising:
a surface modified nano-silica having a primary particle size of from about 10 nm to 20 nm in a total amount of from 5 to 30 wt % by superaddition, wherein the barrier film has a pencil hardness of at least 7 H.

11. The formulation of claim 10, wherein the cross-linker is in from 8 to 40 wt %.

12. The formulation of claim 9, further comprising:
at least one fluorine booster compound selected from a fluorinated urethane-acrylate of formula, a fluorinated epoxy, or a mixture thereof, in a total amount of from 0.1 to 30 wt % by superaddition.

13. The formulation of claim 12, wherein the fluorinated polyimide oligomer is in from 50 to 54 wt %, the cross-linker is in from about 14 to 18 wt %, the tie agent is in from about 5 to 8 wt %, the epoxy silane adhesion promoter is in from about 1.5 to 4 wt %, and the initiator is in from about 2 to 5 wt %, and further wherein the at least one fluorine booster compound is in from about 15 to 30 wt % by superaddition.

14. The formulation of claim 9, wherein the fluorinated polyimide oligomer is in from 62 to 68 wt %, the cross-linker is in from about 17 to 23 wt %, the tie agent is in from about 6 to 10 wt %, the epoxy silane adhesion promoter is in from about 1.5 to 4.5 wt %, and the initiator is in from about 3 to 6 wt %.

15. A method of making a thermoset barrier film, comprising:
combining a reaction product, the reaction product comprising:
a fluorinated polyimide oligomer having anhydride end caps, in from 50 to 90 wt %;
a cross-linker, in from 1 to 40 wt %, comprising a polyhedral oligomeric silsesquioxane having at least one pendant group selected from an epoxy group, a di-aryl group, an acrylate group, or mixtures thereof;
a tie agent having at least one of each of an acrylate group and an epoxy group, in from 0.1 to 20 wt %;
an epoxy silane adhesion promoter, in from 0.1 to 3 wt %; and
an initiator, in from 1 to 20 wt %, based on a total of 100 wt % of the thermoset barrier film;
initiating a reaction of the reaction product after the combining step for a time using radiation, heat or a combination thereof; and
coating the reaction product on a substrate after the initiating step to form a thermoset barrier film on the substrate.

16. The method of claim 15, wherein the reaction product of the combining step further comprises:
a surface modified nano-silica having a primary particle size of from about 10 nm to 20 nm in a total amount of from 5 to 30 wt % by superaddition, wherein the barrier film has a pencil hardness of at least 7 H.

17. The method of claim 15, wherein the reaction product of the combining step further comprises:
at least one fluorine booster compound selected from a fluorinated urethane-acrylate of formula, a fluorinated epoxy, or a mixture thereof, in a total amount of from 0.1 to 30 wt % by superaddition.

18. The method of claim 17, wherein the fluorinated polyimide oligomer is in from 50 to 54 wt %, the crosslinker is in from about 14 to 18 wt %, the tie agent is in from about 5 to 8 wt %, the epoxy silane adhesion promoter is in from about 1.5 to 4 wt %, and the initiator is in from about 2 to 5 wt %, and further wherein the at least one fluorine booster compound is in from about 15 to 30 wt % by superaddition.

19. The method of claim 15, wherein the fluorinated polyimide oligomer is in from 62 to 68 wt %, the crosslinker is in from about 17 to 23 wt %, the tie agent is in from about 6 to 10 wt %, the epoxy silane adhesion promoter is in from about 1.5 to 4.5 wt %, and the initiator is in from about 3 to 6 wt %.

20. The method of claim 15, wherein the thermoset barrier film is electrically isolating and has a voltage breakdown of from 300 to 1900 volts per micron, wherein the barrier film is thermally stable up to at least 250° C. with no loss in mass below 250° C., and further wherein the barrier film has a water contact angle of from 89 degrees to 112 degrees.

* * * * *